United States Patent [19]

Fujita et al.

[11] 4,362,760

[45] Dec. 7, 1982

[54] FIBROUS FOOD MATERIAL AND PROCESS FOR PREPARING THE SAME

[75] Inventors: Hiroyuki Fujita; Shigeki Ashida, both of Takasago; Yoshiaki Taguchi, Kobe; Masami Sakai, Takasago, all of Japan

[73] Assignee: Kanegafuchi Kagaku Kogyo Kabushiki Kaisha, Osaka, Japan

[21] Appl. No.: 242,985

[22] Filed: Mar. 12, 1981

[30] Foreign Application Priority Data

May 9, 1978 [JP] Japan ............................. 53-109389

[51] Int. Cl.³ .............................................. A23J 3/00
[52] U.S. Cl. ................................... 426/641; 426/643; 426/644; 426/656; 426/512; 426/802
[58] Field of Search ............. 426/104, 656, 802, 512, 426/515, 276, 641, 643, 644

[56] References Cited

U.S. PATENT DOCUMENTS 3,812,267  5/1974  Atkinson ............................ 426/104
3,987,213  10/1976  Hawkins ........................ 426/802 X

FOREIGN PATENT DOCUMENTS 51-110062  9/1976  Japan ................................. 426/656
52-45777  11/1977  Japan ................................. 426/802
53-41215  11/1978  Japan ................................. 426/656
54-122762  9/1979  Japan ................................. 426/104

*Primary Examiner*—Robert A. Yoncoskie
*Attorney, Agent, or Firm*—Armstrong, Nikaido, Marmelstein & Kubovcik

[57] ABSTRACT

A fibrous food material for use in meat-like products is provided.

Also provided is a process for preparing the same, by other than a spinning process, which comprises intermixing a hydrous mixture of 3 to 10 parts of wheat protein and 0 to 7 parts of meat on the solid content ratio with a polysaccharide and common salt, then heating the admixture while stretching in an aqueous salt solution of an alkali metal or an alkaline earth metal.

11 Claims, No Drawings

FIBROUS FOOD MATERIAL AND PROCESS FOR PREPARING THE SAME

DETAILED DESCRIPTION OF THE INVENTION

The present invention relates to a processed food material having a continuous fibrous structure and process for preparing the same. More particularly, it relates to a processed food material of a fibrous structure prepared, by other than a spinning process, from wheat protein alone or a mixture of wheat protein and meat such as cattle, chicken, fish and shell, and mollusk.

A fibrous protein obtained, by other than a spinning process, from wheat protein has differed from its image in quality despite the name of "textured" or "fibrous". The textured protein is for example lumbrical, cellular or stringy, being no match for that produced by spinning process.

An object of the present invention is to provide a processed food material of a fibrous structure having a superior quality to that prepared by spinning process.

Another object of the present invention is to provide a process for preparing a processed food material which enables improvement in savor, yield and productivity, and reduction in equipment cost.

A further object of the present invention is to provide a process for making fibrous a mixture of wheat protein and meat such as cattle, chicken, fish and shell-fish, mollusk and so on, thereby preparing a processed food material.

These and other objects will become apparent from the description that follows.

The present inventors have made a series of studies and found that the foregoing objects can be achieved by intermixing a hydrous mixture comprising 3 to 10 parts by weight of wheat protein and 0 to 7 parts by weight of meat based on the solid content ratio with a polysaccharide and common salt, then heating the resulting admixture while stretching the same in an aqueous alkali metal salt or alkaline earth metal salt solution.

According to the present invention, mixtures of wheat protein with meat including cattle, chicken, fish and shell, mollusk and the like which could not hitherto be made fibrous by a process other than spinning process can be made fibrous, and accordingly the present invention supplies a new type of processed food material to the food industry. That is, a material for processed foods having a continuous fibrous structure is obtained from a mixture consisting essentially of not less than 3 parts by weight of wheat protein and not greater than 7 parts by weight of meat based on the solid content ratio. When the meat is employed in a greater proportion, in particular, a processed food material of continuous fibrous structure is characteristically produced and it may be safely said that the present invention provides a food material having savor and palatability resulting from flavor and palatability of meat per se. Processed foods produced from a mixture of short fiber of soybean protein and cattle are also on the market but those contain simply mixed fibers, which differ essentially from those formed from the processed food material of a fibrous structure of the present invention.

Stated more particularly, crude gluten and active gluten extracted by Martin process and the like from wheat flour are intermixed with one or more meats including animal meat such as beef, pork and mutton, chicken, turkey, and seafood such as cod and jack mackerel, mollusk, squid and octopus, thereby preparing a mixture. As the meat employed herein, rawfish meat paste such as cod suffices and a meat obtained by being cut to a suitable size and mixed may also be used. In addition, salted meat used in the production of hams and sausages and dry meat may also be suited. In the step of mixing, it is also possible to add additives such as dyes, pigments and gums, depending upon the quality desired of the finished product.

Moisture contained in the mixture obtained in the mixing step is adjusted to a range of from 50 to 80 percent by weight by adding water when a material of low content of moisture such as active gluten is employed, and then 0.2 to 2.0 percent of polysaccharide such as starch and mannan, more preferably polysaccharide derivatives containing hydrophilic functional groups such as carboxymethyl starch and 0.5 to 20 percent of common salt are added based on the mixture and then admixed. In this step it is preferred to maintain the proportion of polysaccharide to common salt at a range of from 1:1 to 15, more preferably 1:2.5 to 10. In cases where common salt and polysaccharide are added in an amount exceeding the foregoing range and proportion, the obtained admixture degrades in properties with such phenomena that it becomes rigid and loses stretch, fibers become brittle, and so on. Addition of both polysaccharide and common salt in such a proportion as above plays an important role in making the admixture fibrous, in particular, it improves the mixing of protein and meat to thus cause the admixture to be made fibrous more readily for the reason that common salt causes protein to be soluble and association takes place between polysaccharide and protein molecule. It also prevents the admixture from swelling to become cellular during heat stretching that follows.

In the intermixing step, the resulting admixture is preferably maintained at a range of from 0° to 35° C., more preferably 5° to 30° C., through which properties suitable for continuous operation are held for a long period of time. In cases where the temperature exceeds the foregoing range, a drawback arises that properties vary during continuous operation and cutting of sheet-shaped admixture is liable to take place.

The obtained admixture may be extruded in a cylindrical shape or in a ribbon shape from a slit and in the succeeding shaping step it is shaped to be a continuous sheet, 2 to 20 mm thick and 100 to 500 mm wide and simultaneously stretched to 2.5 times or more. The sheet-shaped admixture so obtained is introduced to a heating tank filled with an aqueous salt solution, while being further stretched. The purpose of employing the aqueous salt solution in heating step is not only to enable fixation in a short time while maintaining a randomly twined fibrous structure, but to simplify the control for production of continuous fiber of a uniform quality. That is, it is said that in a conventional process gluten, when heated rapidly, swells and exhibits no fibrous structure. For that reason it is first softened or heated gradually at a temperature between 60° and 70° C., thereafter being elevated up to about 80° C. to make it fibrous. This process, however, is complicated and difficult to control for obtaining a continuous fiber of a uniform quality. The process of the present invention in which a heated aqueous salt solution is used has an advantage that a superior fibrous structure which neither bubbles nor swells even when elevated rapidly, while avoiding the drawbacks of the conventional process.

A process other than the present invention, raises the defects in that adhesion of fibers takes place again and fibers are melted to cause adhesion when heated in the processing step.

As an aqueous salt solution, there is preferably included an aqueous salt solution of an alkali metal or an alkaline earth metal, above all, an aqueous solution of chlorides such as common salt, lime chloride and so on is most preferable.

The heating time is variable according to the employment or not or the sort of meat employed, but 3 to 15 minutes are normally suitable. Moreover, heating concurrent with stretching is more preferred. The stretching should be preferably effected to 3 to 15 times including the shaping step. The temperature is preferred between 85° and 98° C., more preferably between 90° and 95° C. The concentration of the aqueous salt solution should be maintained as low as possible, preferably between 0.3 and 20 percent, more preferably between 0.5 and 10 percent, taking into consideration that adhesion of the aqueous salt solution in the succeeding steps is minimized so that it might leave no undesired influences to cooling and processing.

Although a new process for making gluten fibrous has recently been proposed in which gluten is unraveled in a highly concentrated aqueous solution containing chloride of an alkali metal or an alkaline earth metal, the present invention enables the same in a heated low concentrated aqueous salt solution and provides a product of a fibrous structure not at all inferior to that prepared by such the process. According to the present invention productivity as a result of continuous production is enhanced and a production equipment is simplified. Furthermore, the present invention is very advantageous in that an aqueous low concentrated salt solution is used and the solution discharged is in such a small quantity as overflow from the heating tank that treatment of waste water is exceedingly simple, whereas such a process as using a highly concentrated aqueous solution containing alkali metal chlorides or alkaline earth metal chlorides is accompanied by a disadvantage that a large exposure must be required for the treatment of the highly concentrated chlorides as industrial waste.

The sheet-shaped product obtained by such a series of steps as aforesaid is suitably cut depending upon processing usages and is subjected to seasoning. It is processed to simulate split calamary (dried squid) as dainty bits or processed to be block-shaped to simulate meat, or further dried to simulate jerked beef. Moreover it may also be processed to simulate dice-shaped meat boiled down in a soy or shell-ligament. As stated above, it can be a new food more advanced than any other simulated products.

The present invention will be explained in more detail by way of examples that follow, to which examples the present invention is not construed to be limited.

EXAMPLE 1

Crude gluten: 4 parts
Beef (in a state of paste): 5 parts
Common salt: 1 part
Carboxymethyl starch: 0.1 part 40 Kg of crude gluten, 50 Kg of beef paste, 10 Kg of common salt and 1 Kg of carboxymethyl starch are metered and introduced to a continuous type of mixer having double-screw mixing blades and mixed to allow the resulting admixture have the above composition. The admixture is controlled to be at 5° C. The obtained admixture is then led to a shaping apparatus by means of a metering pump for a high viscosity material wherein it is shaped into a sheet, 300 mm wide and 10 mm thick, while being stretched to about twice the length, thereafter being passed to a heating tank filled with a 5 percent common salt aqueous solution. The admixture passed in a sheet shape is heated for about 10 minutes in the heating tank maintained at a temperature between 85° and 95° C., while being further stretched to about four times, thereby to produce 90 Kg of a fibrous material for processed foods to which random fibrous structure is fixed. The material so obtained is subjected to seasoning and drying, then cutting to obtain 40 Kg of simulated dry meat with 17 percent of moisture superior in fibrous property and chewy characteristics of meat.

EXAMPLE 2

Crude gluten: 2 parts
Active gluten: 0.3 part
Chicken: 6.5 parts
Water: 0.4 part
Common salt: 0.8 part
Carboxymethyl starch: 0.2 part So as to allow an admixture to have the foregoing composition, 20 Kg of crude gluten, 3 Kg of active gluten, 65 Kg of chicken, 8 Kg of common salt, 4 Kg of water and 2 Kg of carboxymethyl starch are metered and introduced to a continuous type of mixer equipped with double-screw mixing blades in which mixing is effected. The so obtained admixture is passed to a shaping apparatus by means of triple piston type extruder where it is shaped to be in a sheet shape having 250 mm in width and 15 mm in thickness while being stretched to one and half times, then passed to a heating tank which is filled with a 5 percent common salt aqueous solution. The admixture passed as a sheet shape is heated for about 5 minutes in the heating tank elevated at a temperature between 85° and 95° C. while being further stretched to about twice the length, whereby about 90 Kg of a fibrous material for processed foods containing chicken is prepared, to which random fibrous structure is fixed. The material thus obtained is further introduced to a seasoning tank where it is seasoned to be a desired flavor, then cut in a dice shape having about 1 cm length, thus to obtain about 70 Kg of preserved food boiled down in soy.

EXAMPLE 3

Crude gluten: 9.5 parts
Common salt: 0.5 part

19 Kg of crude gluten, 1 Kg of common salt and 200 g of carboxymethylcellulose are metered so as to obtain an admixture having the above composition and led to a continuous type of mixer equipped with a double-screw mixing blade where mixing is carried out. The admixture obtained is continuously passed to a shaping apparatus by means of triple piston type extruder, where a sheet having 350 mm width and 7 mm thickness is formed while being stretched to about 2.5 times and then passed to a heating tank filled with a 3 percent common salt aqueous solution. The sheet-shaped admixture is heated for about 10 minutes in the heating tank elevated at a temperature of from 90° to 95° C. while being further stretched to about twice the length, thereby producing 18 Kg of a fibrous material for processed foods to which a continuous fibrous structure is fixed. The resulting material is subjected to a seasoning step and drying step, then followed by cutting and splitting, whereby about 10 Kg of a dainty bit with simulation of split sagittated calamary are obtained.

What is claimed is:

1. A process for preparing a processed food material of a continuous fibrous structure which comprises intermixing (1) a hydrous mixture containing 50–80% moisture and consisting essentially of 3 to 10 parts by weight of wheat protein and 0 to 7 parts by weight of meat based on the solid content ratio with (2) polysaccharide in an amount of 0.2 to 2.0% by weight of said hydrous mixture and (3) common salt in an amount of 0.5 to 20% by weight of said hydrous mixture, the ratio of said polysaccharide to said common salt being 1:1 to 15; forming the resulting admixture into a shape suitable for stretching, the temperature of the admixture throughout the intermixing step and forming step being maintained at 5°–30° C.; and then heating said shaped admixture at 85°–98° C. while stretching the same in a 0.5 to 10% aqueous salt solution of an alkali metal or an alkaline earth metal.

2. The process of claim 1, wherein the wheat protein is selected from the group consisting of crude gluten, active gluten and a mixture thereof.

3. The process of claim 1, wherein the meat is selected from the group consisting of cattle, chicken, fish, shell-fish, mollusk and a mixture thereof.

4. The process of claim 1, wherein the polysaccharide is polysaccharide derivatives having hydrophilic functional groups.

5. The process of claim 4, wherein the polysaccharide derivative having hydrophilic functional groups is selected from the group consisting of carboxymethyl starch, carbamylethyl starch, carboxymethylcellulose and a mixture thereof.

6. The process of claim 1, wherein the polysaccharide and the common salt are added in a proportion of polysaccharide to common salt of 1:2.5 to 10.

7. The process of claim 1, wherein the aqueous salt solution is an aqueous solution of an alkali metal chloride or an alkaline earth metal chloride.

8. The process of claim 7, wherein the aqueous salt solution is an aqueous solution of common salt or calcium chloride.

9. The process of claim 1, wherein a temperature of the aqueous salt solution is 90° to 95° C.

10. The process of claim 1, wherein the resulting admixture is stretched to 3 to 15 times.

11. A processed food material of a continuous fibrous structure produced by the process of claim 1.

* * * * *